United States Patent
Giuseppe et al.

(10) Patent No.: US 11,089,008 B2
(45) Date of Patent: Aug. 10, 2021

(54) SYSTEM AND METHOD FOR FACILITATING PRE AUTHENTICATION OF USER[S] INTENDED TO ACCESS DATA RESOURCES

(71) Applicant: HCL Technologies Italy S.p.A, Vimodrone (IT)

(72) Inventors: Longobardi Giuseppe, Via Pio Emanuelli (IT); Barillari Fabio, Via Pio Emanuelli (IT)

(73) Assignee: HCL Technologies Italy S.p.A., Milan (IT)

( * ) Notice: Subject to any disclaimer, the term of this patent is extended or adjusted under 35 U.S.C. 154(b) by 267 days.

(21) Appl. No.: 16/195,967

(22) Filed: Nov. 20, 2018

(65) Prior Publication Data

US 2020/0162446 A1 May 21, 2020

(51) Int. Cl.
*H04L 29/06* (2006.01)
*G06F 16/955* (2019.01)

(52) U.S. Cl.
CPC .......... *H04L 63/083* (2013.01); *G06F 16/955* (2019.01)

(58) Field of Classification Search
CPC ... H04L 63/083; H04L 63/108; G06F 16/955; G06F 21/31
See application file for complete search history.

(56) References Cited

U.S. PATENT DOCUMENTS

| 7,139,917 | B2 | 11/2006 | Jablon |
| 8,549,314 | B2 * | 10/2013 | Mahmoud Abd Alla ............ G06F 21/31 713/183 |

(Continued)

FOREIGN PATENT DOCUMENTS

| CN | 102752285 | 3/2015 |
| WO | 2016161889 | 10/2016 |

(Continued)

OTHER PUBLICATIONS

"Secure Client-Server Authentication System Using Grid Based and Zero Knowledge Protocol with RSA Cryptography GZ-RSA)" Manoj Dhande, Ankita Bamania, Urvi Menta, Vatsal Bfieda, Sujay Vaidya 2017.

(Continued)

*Primary Examiner* — Kevin Bechtel
*Assistant Examiner* — Hamid Talaminaei
(74) *Attorney, Agent, or Firm* — HM Law Group LLP; Vani Moodley, Esq.

(57) ABSTRACT

Disclosed is a client system for facilitating authentication of a user characterized by validating a password, at the client machine, transmitted by a server. In order to authenticate the user, initially, the client machine transmits a User Identification (ID) to the server. Upon receipt of the User ID, the server receives the User ID from the client machine and accordingly transmits a password to the client machine. In one aspect, the password may be transmitted by identifying the password, pertaining to the User ID, from a server password database and altering the password, to be transmitted, based on the metadata by using a Random Character Generator (RCG) algorithm. Subsequently, the client machine receives the password pertaining to the User ID from the server. Post receipt of the password, the client machine compares the password with a complementary password stored in a client password database presents on a client machine. Subsequent to the comparison of the password, the client machine prepares a response to the comparison based on determination of an algorithm of a plurality of algorithms stored in the client password database. The client machine then transmits the response to the server in order to authenticate a user of the client machine. Upon receipt of the response, the server transmits an acknowledgment to the client machine. The acknowledgment may be (Continued)

transmitted by verifying the response upon referring to the server password database. The client machine then obtains the acknowledgment from the server. In one aspect, the acknowledgment may indicate that the user is authenticated.

10 Claims, 6 Drawing Sheets

(56) References Cited

U.S. PATENT DOCUMENTS

| | | | | |
|---|---|---|---|---|
| 8,832,804 | B1* | 9/2014 | Casey | G06F 21/31 |
| | | | | 726/5 |
| 2003/0005299 | A1* | 1/2003 | Xia | G06F 21/31 |
| | | | | 713/171 |
| 2011/0161289 | A1* | 6/2011 | Pei | G06F 16/275 |
| | | | | 707/613 |
| 2014/0089777 | A1* | 3/2014 | Roiniotis | G06F 3/048 |
| | | | | 715/234 |
| 2016/0191526 | A1* | 6/2016 | Panchapakesan | H04L 63/10 |
| | | | | 726/1 |
| 2016/0292413 | A1* | 10/2016 | Williams | G06F 21/31 |

FOREIGN PATENT DOCUMENTS

| | | | | |
|---|---|---|---|---|
| WO | WO-2016161889 | A1 * | 10/2016 | H04L 29/06 |
| WO | 2017185913 | | 11/2017 | |

OTHER PUBLICATIONS

"Two Level Authentication System Based on Pair Based Authentication and Image Selection" Madhuri Achmani, Radhika Dehaley, Anuja Gaonkar, Anindita Khade Apr. 2016.

* cited by examiner

| Day | Time Window | Position | Length | Algorithm | Password | | |
|---|---|---|---|---|---|---|---|
| Sunday | ... | ... | ... | ... | ... | | |
| Monday | 08:00 | 4 | 19 | 4 | ... | | |
| Monday | 08:30 | 11 | 12 | 3 | ... | | |
| Monday | 09:00 | 2 | 18 | 8 | ... | | |
| Monday | 09:30 | 15 | 20 | 6 | TR0Y642098gV4B9mJ897 | | |
| Monday | 10:00 | 6 | 16 | 2 | B2574_BHX181K7E5 | | |
| Tuesday | ... | ... | ... | ... | ... | | |
| | January | February | March | April | June | July | ... |

Figure 4

| Algorithm No. | Description |
|---|---|
| 1 | Identify position of right password character and provide sum |
| 2 | Identify position of wrong password character and provide sum |
| 3 | Sum the difference of the ranges between exact and wrong character |
| 4 | Identify position of right password character and provide sum minus 12 |
| 5 | ... |
| 6 | Identify position of wrong password character and provide sum of the odd |
| 7 | ... |
| ... | ... |
| 15 | Identify position of wrong password character and provide sum plus 5 |

Figure 5

SYSTEM AND METHOD FOR FACILITATING PRE AUTHENTICATION OF USER[S] INTENDED TO ACCESS DATA RESOURCES

CROSS REFERENCE TO RELATED APPLICATIONS

This patent application does not claim priority from any application.

TECHNICAL FIELD

The present subject matter described herein, in general, relates to a method and system for facilitating authentication of a user logging into an Information Technology (IT) enabled application. More specifically, the method and system for validating a password, at a client machine, transmitted by a server to the client machine.

BACKGROUND

It may be noted that authentication is a means for letting a user to access resources stored in a system. In order to allow the user to access the resources, the system prompts the user to provide his/her user credentials which he/she has used during registration with the system. The user credentials, once provided, may then be authenticated by the system to authenticate the user. When the user credentials are matched with a complementary reference values stored in the system, the user is allowed to access the resources. Else, the system restricts the user for accessing the resources. It may be noted that evolution in user authentication technology has led to more challenges in providing security for users to safeguard the resources of the particular system. Authentication is one such important aspect of security which provides access control for the users of an application.

In a client-server architecture, the user, intended to access the resources stored on a server, is prompted to authenticate himself/herself through a client machine at the beginning of a session establishment with the server. To authenticate himself/herself, the user is prompted to provide the user credentials to the server. It has been observed that during this authentication process while the user floats the user credentials over a network, an intruder with malicious intentions may steal the user credentials in order to fraudulently reuse them. Although some means like cryptography and/or VPN, are used to ensure that the information flowing over the communication channel is safe. However, the weakness of some cryptography algorithm (such as SSL V2) and of some network backdoor might offer the intruder to steal the user credentials for malicious activities.

SUMMARY

Before the present systems and methods, are described, it is to be understood that this application is not limited to the particular systems, and methodologies described, as there can be multiple possible embodiments which are not expressly illustrated in the present disclosure. It is also to be understood that the terminology used in the description is for the purpose of describing the particular versions or embodiments only, and is not intended to limit the scope of the present application. This summary is provided to introduce concepts related to systems and methods for authenticating a user by validating a password, at a client machine, transmitted by a server to the client machine and the concepts are further described below in the detailed description. This summary is not intended to identify essential features of the claimed subject matter nor is it intended for use in limiting the scope of the claimed subject matter.

In one implementation, a client machine for authenticating a user by validating a password, at a client machine, transmitted by a server to the client machine is disclosed. The client machine may comprise a processor and a memory coupled to the processor. The processor may execute a plurality of modules present in the memory. The plurality of modules may comprise a client machine transmission module, a client machine receiving module, a comparator module, and an authentication module. The client machine transmission module may transmit a User Identification (ID) to a server. The client machine receiving module may receive a password pertaining to the User ID from the server. In one aspect, the server may transmit the password to the client machine by identifying the password, pertaining to the User ID, from a server password database storing a plurality of passwords and metadata associated to each password. The client machine receiving module may further alter the password, to be transmitted, based on the metadata. The comparator module may compare the password with a complementary password stored in a client password database presents on a client machine. In one aspect, the client password database and the server password database are having an identical schema and storing identical value in each cell. It may be noted that the password may be compared with the complementary password based on the metadata. The authentication module may prepare a response to the comparison based on determination of an algorithm of a plurality of algorithms stored in the client password database. In one aspect, each algorithm may indicate a unique set of rules that needs to be applied on the comparison. The authentication module may further transmit the response to the server in order to authenticate the user of the client machine. The authentication module may further obtain an acknowledgment from the server. In one aspect, the acknowledgment may be obtained when the server verifies the response upon referring to the server password database. The acknowledgment indicates that the user is authenticated.

In another implementation, a method for authenticating a user characterized by validating a password, at a client machine, transmitted by a server to the client machine is disclosed. In order to authenticate the user, initially, a User Identification (ID) may be transmitted to a server. Subsequently, a password pertaining to the User ID may be received from the server. In one aspect, the server may transmit the password to the client machine by identifying the password, pertaining to the User ID, from a server password database and altering the password, to be transmitted, based on metadata. In one aspect, the server password database stores a plurality of passwords and the metadata associated to each password. Post receipt of the password, the password may be compared with a complementary password stored in a client password database presents on a client machine. In one aspect, the client password database and the server password database are having an identical schema and storing identical value in each cell. It may be noted that the password may be compared with the complementary password based on the metadata. Subsequent to the comparison of the password, a response to the comparison may be prepared based on determination of an algorithm of a plurality of algorithms stored in the client password database. In one aspect, each algorithm indicates a unique set of rules that needs to be applied on the comparison. The response may then be transmitted to the server in order to authenticate the user of the client machine. Upon transmission of the response, an acknowledgment may be obtained from the server. In one aspect, the acknowledgment may be obtained when the server verifies the response upon referring to the server password database. The acknowledgment indicates that the user is authenticated. In one aspect, the aforementioned method for authenticating a user may be performed by a processor using programmed instructions stored in a memory of the client machine.

In one implementation, a non-transitory computer readable medium embodying a program executable in a computing device for authenticating a user characterized by validating a password, at a client machine, transmitted by a server to the client machine is disclosed. The program may comprise a program code for transmitting a User Identification (ID) to a server. The program may further comprise a program code for receiving a password pertaining to the User ID from the server, wherein the server transmits the password to the client machine by identifying the password, pertaining to the User ID, from a server password database storing a plurality of passwords and metadata associated to each password and altering the password, to be transmitted, based on the metadata. The program may further comprise a program code for comparing the password with a complementary password stored in a client password database presents on a client machine, wherein the client password database and the server password database are having an identical schema and storing identical value in each cell, and wherein the password is compared with the complementary password based on the metadata. The program may further comprise a program code for preparing a response to the comparison based on determination of an algorithm of a plurality of algorithms stored in the client password database, wherein each algorithm indicates a unique set of rules that needs to be applied on the comparison. The program may further comprise a program code for transmitting the response to the server in order to authenticate a user of the client machine. The program code for obtaining an acknowledgment from the server, wherein the acknowledgment is obtained when the server verifies the response upon referring to the server password database, and wherein the acknowledgment indicates that the user is authenticated.

In one implementation, a server for facilitating authentication of a user characterized by transmitting a password to the client machine is disclosed. The server may comprise a processor and a memory coupled to the processor. The processor may execute a plurality of modules present in the memory. The plurality of modules may comprise a server receiving module and a server transmission module. The server receiving module may receive a User Identification (ID) from a client machine. The server transmission module may transmit a password pertaining to the User ID to the client machine. In one aspect, the password may be transmitted by identifying the password, pertaining to the User ID, from a server password database and altering the password, to be transmitted, based on the metadata by using a Random Character Generator (RCG) algorithm. In one aspect, the server password database comprises a plurality of passwords and metadata associated to each password. It may be noted that the server password database is present on the server. The server receiving module may receive a response prepared by the client machine in order to authenticate a user of the client machine. In one aspect, the response may be prepared by comparing the password with a complementary password stored in a client password database presents on a client machine. It may be noted that the client password database and the server password database are having an identical schema and storing identical value in each cell. In one aspect, the password is compared with the complementary password based on the metadata. Upon comparison, a response to the comparison may be prepared based on determination of an algorithm of a plurality of algorithms stored in the client password database. In one aspect, each algorithm may indicate a unique set of rules that needs to be applied on the comparison. The server transmission module may further transmit an acknowledgment to the client machine. In one aspect, the acknowledgment may be transmitted by verifying the response upon referring to the server password database. In one aspect, the acknowledgment may indicate that the user is authenticated.

In another implementation, a method for authenticating a user characterized by transmitting a password to the client machine is disclosed. In order to authenticate the user, a User Identification (ID) may be received from a client machine. Upon receipt of the User ID, a password, pertaining to the User ID, may be transmitted to the client machine. In one aspect, the password may be transmitted by identifying the password, pertaining to the User ID, from a server password database and altering the password, to be transmitted, based on the metadata by using a Random Character Generator (RCG) algorithm. In one aspect, the server password database stores a plurality of passwords and metadata associated to each password. In one aspect, the server password database may be present on the server. Upon transmission of the password, a response may be prepared by the client machine in order to authenticate a user of the client machine. In one aspect, the response may be prepared by comparing the password with a complementary password stored in a client password database presents on a client machine. In one aspect, the client password database and the server password database are having an identical schema and storing identical value in each cell. In one aspect, the password is compared with the complementary password based on the metadata. Post comparison of the password, a response to the comparison may be prepared based on determination of an algorithm of a plurality of algorithms stored in the client password database. In one aspect, each algorithm indicates a unique set of rules that needs to be applied on the comparison. Subsequent to the receipt of the response, the server transmission module may transmit an acknowledgment to the client machine. The acknowledgment may be transmitted by verifying the response upon referring to the server password database. In one aspect, the acknowledgment may indicate that the user is authenticated. In one aspect, the aforementioned method for authenticating the user may be performed by a processor using programmed instructions stored in a memory of the server.

In one implementation, a non-transitory computer readable medium embodying a program executable in a computing device for authenticating a user characterized by transmitting a password to the client machine is disclosed. The program may comprise a program code for receiving a User Identification (ID) from a client machine. The program may further comprise a program code for transmitting a password pertaining to the User ID to the client machine. In one aspect, the password may be transmitted by identifying the password, pertaining to the User ID, from a server password database storing a plurality of passwords and metadata associated to each password, wherein the server password database is present on the server and altering the password, to be transmitted, based on the metadata by using a Random Character Generator (RCG) algorithm. The program may further comprise a program code for receiving a response prepared by the client machine in order to authenticate a user of the client machine, wherein the response is prepared by comparing the password with a complementary password stored in a client password database presents on a client machine, wherein the client password database and the server password database are having an identical schema and storing identical value in each cell, and wherein the password is compared with the complementary password based on the metadata and preparing a response to the comparison based on determination of an algorithm of a plurality of algorithms stored in the client password database, wherein each algorithm indicates a unique set of rules that needs to be applied on the comparison. The program may further comprise a program code for transmitting an acknowledgment to the client machine, wherein the acknowledgment is transmitted by verifying the response upon referring to the server password database, and wherein the acknowledgment indicates that the user is authenticated. In all cases, after the user is authenticated in this pre-authentication phase, the user may or may not be prompted, by the server, to provide an original password, as per normal authentication process. In case the user is not positively pre-authenticated by the server, the failed attempt is recorded and the server may not prompt the client machine to provide the original password.

BRIEF DESCRIPTION OF THE DRAWINGS

The foregoing detailed description of embodiments is better understood when read in conjunction with the appended drawings. For the purpose of illustrating the disclosure, example constructions of the disclosure are shown in the present document; however, the disclosure is not limited to the specific methods and apparatus disclosed in the document and the drawings.

The detailed description is given with reference to the accompanying figures. In the figures, the left-most digit(s) of a reference number identifies the figure in which the reference number first appears. The same numbers are used throughout the drawings to refer like features and components.

FIGS. 4 and 5 illustrate data including password and metadata associated to each password stored in a client password database and a server password database, in accordance with an embodiment of the present subject matter.

DETAILED DESCRIPTION

Figure 1:
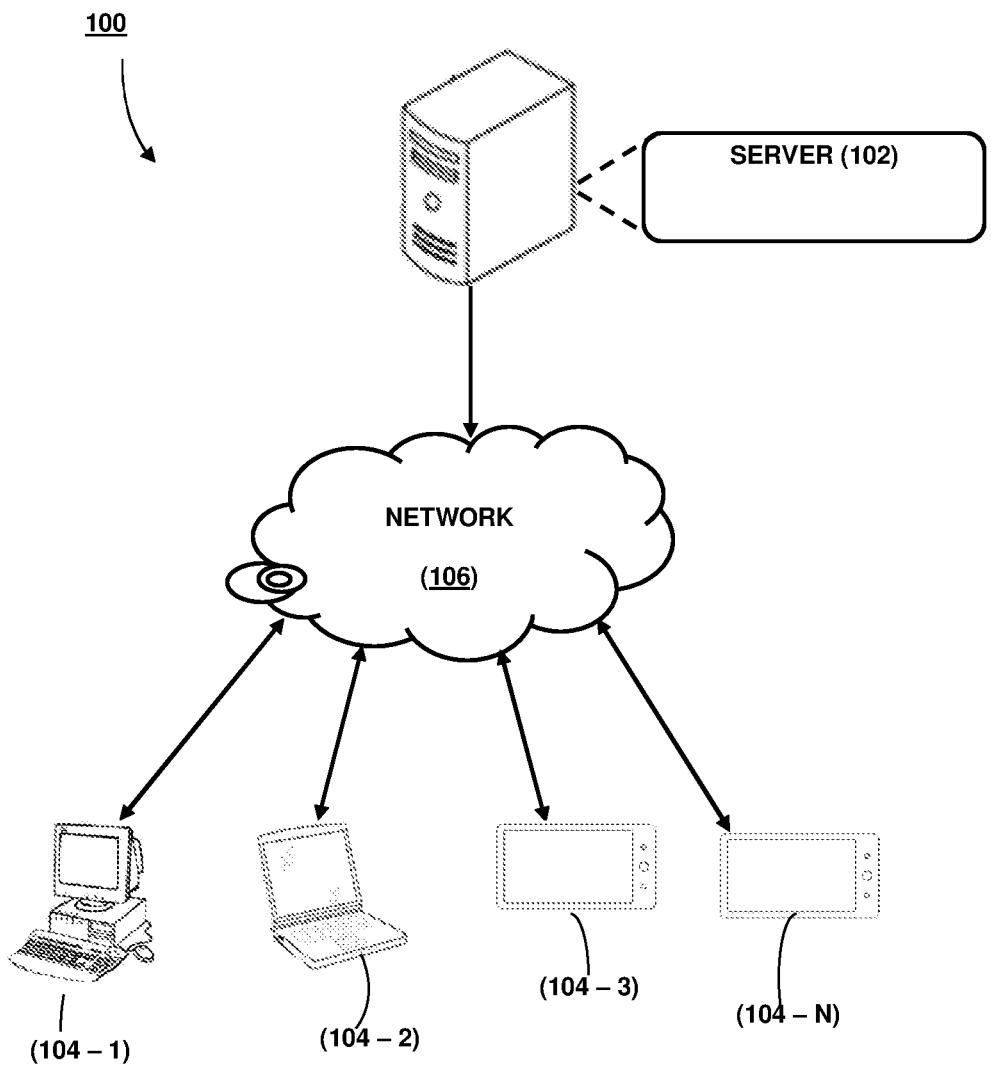
FIG. 1 illustrates a network implementation of a client machine for facilitating authentication of a user by validating a password, at the client machine, transmitted by a server, in accordance with an embodiment of the present subject matter.

Some embodiments of this disclosure, illustrating all its features, will now be discussed in detail. The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise. Although any systems and methods similar or equivalent to those described herein can be used in the practice, the exemplary, systems and methods are now described. The disclosed embodiments are merely exemplary of the disclosure, which may be embodied in various forms.

Various modifications to the embodiment will be readily apparent to those skilled in the art and the generic principles herein may be applied to other embodiments. However, one of ordinary skill in the art will readily recognize that the present disclosure is not intended to be limited to the embodiments illustrated, but is to be accorded the widest scope consistent with the principles and features described herein.

It may be noted that the proposed invention does not facilitate to overcome the problem of interception used to retrieve flow information, including user credentials, from a network communication. The proposed invention provides a mechanism and a methodology to avoid the user credentials stolen by the intruders from the network.

The proposed invention facilitates the user, using a client machine, to provide a User Identification (ID) during establishment of a session in a client-server architecture. Upon identification of the user, the server transmits a password to the client machine. It may be noted that the password, to be transmitted, is generated by the server upon referring to a pool of passwords stored in a server password database present on the server. From the pool of passwords, the server selects an original password based on metadata associated to receipt of the User ID. The metadata may include, but not limited to, day of receipt of the User ID, time of receipt of the User ID, month of receipt of the User ID, an algorithm that needs to be implemented for altering the password.

Upon selection of the original password, the server alters the original password. It may be noted that the original password is altered by rearranging one or more characters of the password or substituting one or more incorrect character with correct character in the original password. Once altered, the server transmits the altered password to the client machine for validation.

Upon receipt of the altered password, the user needs to validate the altered password in accordance with a pre-shared schema stored at the client machine. In order to validate the altered password, the user analyzes the altered password and maps the altered password with an expected password to determine the errors in the password. It may be noted that the original password and the expected password are same and the client machine also stores the pool of passwords and the metadata associated to each password in a client password database present on the client machine. In other words, the server password database and the client password database are having identical schema and storing the same set of data.

Upon determination of the errors, the user prepares a response by performing computations on the errors based on at least one algorithm determined from a pre-shared pool of algorithms. It may be noted that the at least one algorithm is determined based on the metadata i.e. Day of transmission of the User ID and the Time of transmission of the User ID.

In one example, the response to be prepared based on one of the pre-shared pool of algorithms indicating a number of wrong characters detected in the password, a number of correct characters, a sum of numbers identifying the position of correct and incorrect characters, and a number including digits of correct and incorrect characters. Once the response is prepared, the user transmits the response to the server for validation.

Based on the above, the user may be authenticated without floating an original password over the network. Thus, in this manner, the intruders may not be allowed to access the resources that the user is intended to access even if the intruders capture the password floated over the network by the user. Further it would be very unlikely that the password transmitted by the server may repeat in a reasonable amount of time due to the fact that the algorithms may vary periodically which makes challenging for the intruders to intercept the password floated on the network. While aspects of described system and method for authenticating the user may be implemented in any number of different computing systems, environments, and/or configurations, the embodiments are described in the context of the following exemplary system.

Referring now to FIG. 1, a network implementation 100 of a client system 104 for facilitating authentication of a user characterized by validating a password, at the client machine 104, transmitted by a server 102. In order to authenticate the user, initially, the client machine 104 transmits a User Identification (ID) to the server 102. Upon receipt of the User ID, the server 102 receives the User ID from the client machine 104 and accordingly transmits a password to the client machine 104. In one aspect, the password may be transmitted by identifying the password, pertaining to the User ID, from a server password database and altering the password, to be transmitted, based on the metadata by using a Random Character Generator (RCG) algorithm. Subsequently, the client machine 104 receives the password pertaining to the User ID from the server 102. Post receipt of the password, the client machine 102 compares the password with a complementary password stored in a client password database. Subsequent to the comparison of the password, the client machine 104 prepares a response to the comparison based on determination of an algorithm of a plurality of algorithms stored in the client password database. The client machine 104 then transmits the response to the server 102 in order to authenticate the user of the client machine. Upon receipt of the response, the server 102 transmits an acknowledgment to the client machine 104. The acknowledgment may be transmitted by verifying the response upon referring to the server password database. The client machine 104 then obtains the acknowledgment from the server 102. In one aspect, the acknowledgment may indicate that the user is authenticated.

It may be understood that the server 102 may be implemented in a variety of computing systems, such as a laptop computer, a desktop computer, a notebook, a workstation, a mainframe computer, a server, a network server, a cloud-based computing environment. It will be understood that the server 102 may be accessed by multiple users through one or more client machines 104-1, 104-2 . . . 104-N, collectively referred to as user 104 or stakeholders, hereinafter, or applications residing on the client machine 104. In one implementation, the server 102 may comprise the cloud-based computing environment in which a user may operate individual computing systems configured to execute remotely located applications. Examples of the client machines 104 may include, but are not limited to, a IoT device, IoT gateway, portable computer, a personal digital assistant, a handheld device, and a workstation. The client machine 104 is communicatively coupled to the server 102 through a network 106.

In one implementation, the network 106 may be a wireless network, a wired network or a combination thereof. The network 106 can be implemented as one of the different types of networks, such as intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Hypertext Transfer Protocol Secure (HTTPS), Transmission Control Protocol/Internet Protocol (TCP/IP), Wireless Application Protocol (WAP), and the like, to communicate with one another. Further the network 106 may include a variety of network devices, including routers, bridges, servers, computing devices, storage devices, and the like.

Figure 2:
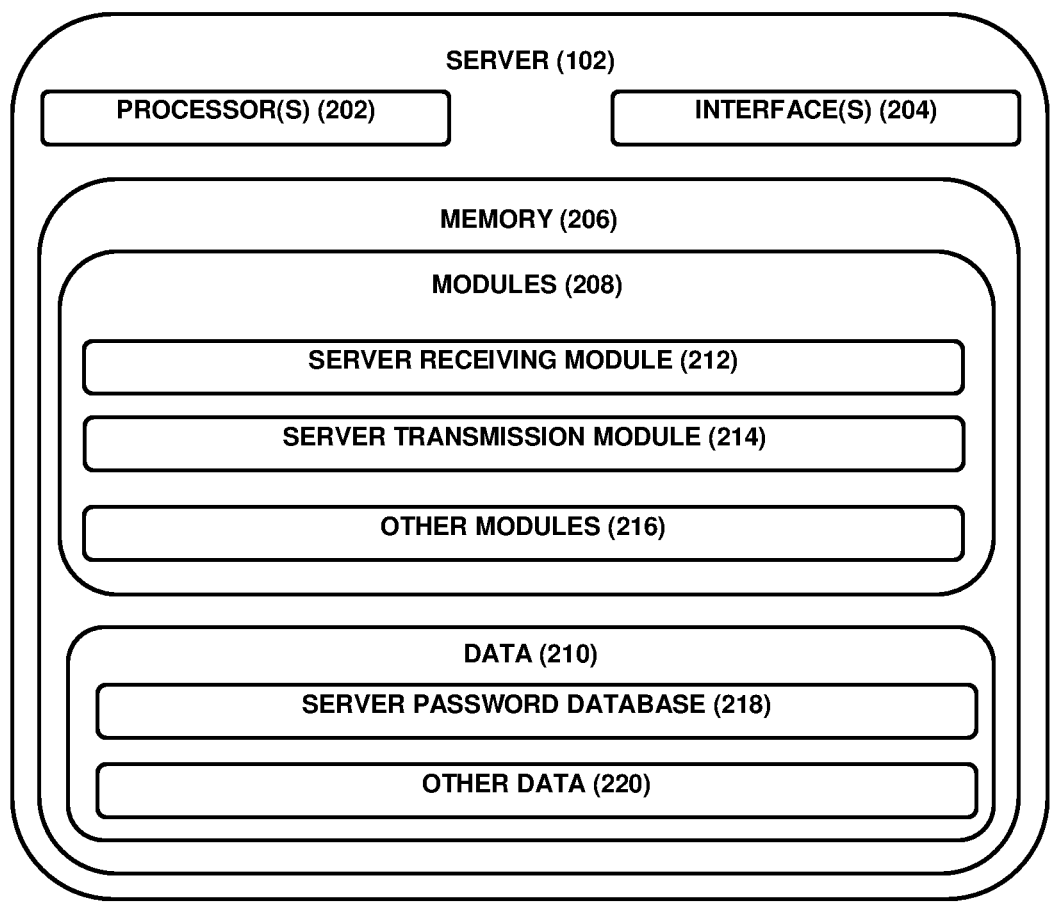
FIG. 2 illustrates the server, in accordance with an embodiment of the present subject matter.

Referring now to FIG. 2, the server 102 is illustrated in accordance with an embodiment of the present subject matter. In one embodiment, the server 102 may include at least one processor 202, an input/output (I/O) interface 204, and a memory 206. The at least one processor 202 may be implemented as one or more microprocessors, microcomputers, microcontrollers, digital signal processors, central processing units, state machines, logic circuitries, and/or any devices that manipulate signals based on operational instructions. Among other capabilities, the at least one processor 202 is configured to fetch and execute computer-readable instructions stored in the memory 206.

The I/O interface 204 may include a variety of software and hardware interfaces, for example, a web interface, a graphical user interface, and the like. The I/O interface 204 may allow the system 102 to interact with the user directly or through the user devices 104. Further, the I/O interface 204 may enable the server 102 to communicate with other computing devices, such as web servers and external data servers (not shown). The I/O interface 204 can facilitate multiple communications within a wide variety of networks and protocol types, including wired networks, for example, LAN, cable, etc., and wireless networks, such as WLAN, cellular, or satellite. The I/O interface 204 may include one or more ports for connecting a number of devices to one another or to another server.

The memory 206 may include any computer-readable medium or computer program product known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory 206 may include modules 208 and data 210.

The modules 208 include routines, programs, objects, components, data structures, etc., which perform particular tasks or implement particular abstract data types. In one implementation, the modules 208 may include a server receiving module 212, a server transmission module 214, and other modules 216. The other modules 216 may include programs or coded instructions that supplement applications and functions of the system 102. The modules 208 described herein may be implemented as software modules that may be executed in the cloud-based computing environment of the server 102.

The data 210, amongst other things, serves as a repository for storing data processed, received, and generated by one or more of the modules 208. The data 210 may also include a server password database 218 and other data 220. The other data 220 may include data generated as a result of the execution of one or more modules in the other modules 218.

Figure 3:
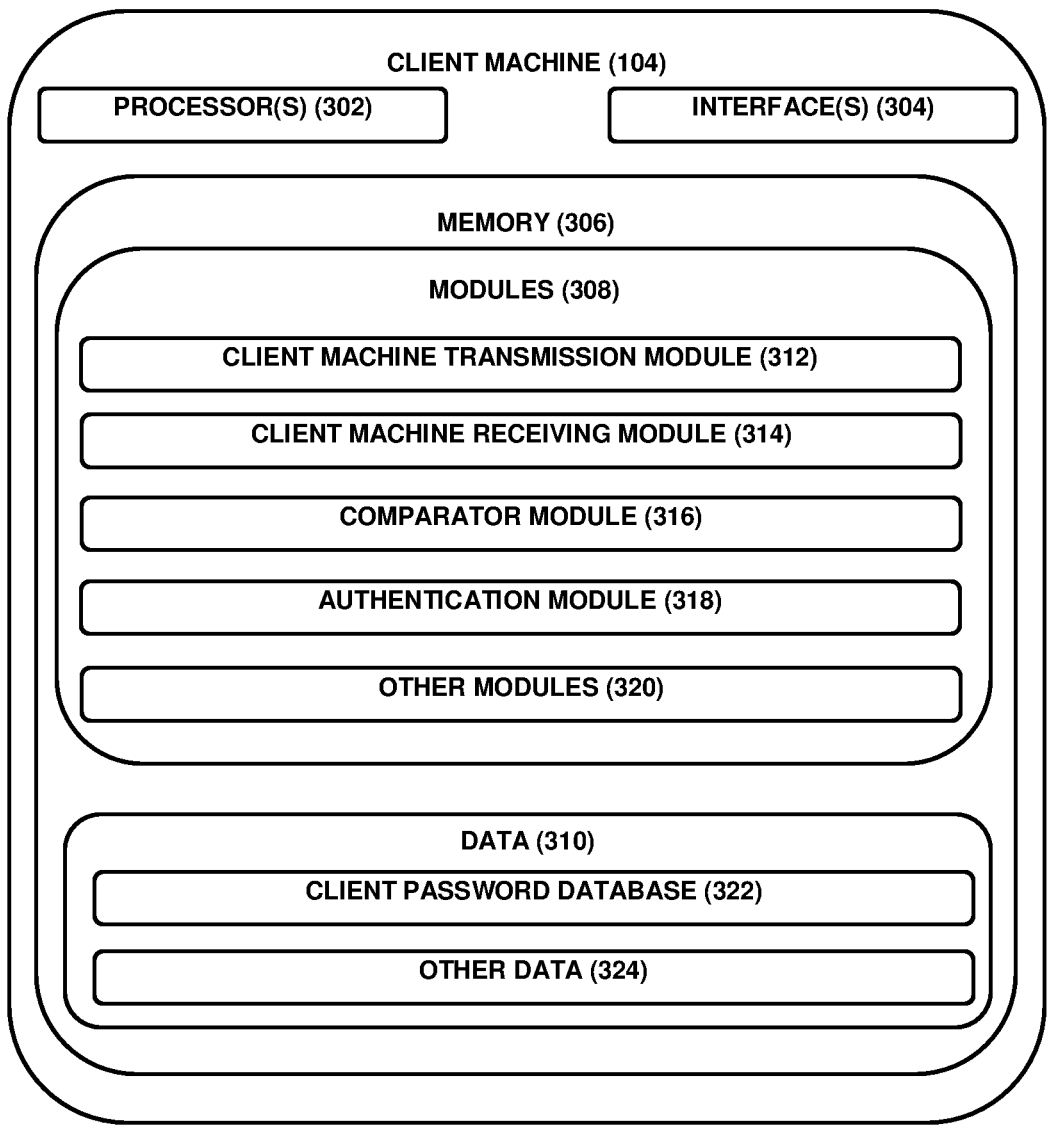
FIG. 3 illustrates the client machine, in accordance with an embodiment of the present subject matter.

Referring now to FIG. 3, the client machine 104 is illustrated in accordance with an embodiment of the present subject matter. In one embodiment, the client machine 104 may include at least one processor 302, an input/output (I/O) interface 304, and a memory 306. The at least one processor 302 may be implemented as one or more microprocessors, microcomputers, microcontrollers, digital signal processors, central processing units, state machines, logic circuitries, and/or any devices that manipulate signals based on operational instructions. Among other capabilities, the at least one processor 302 is configured to fetch and execute computer-readable instructions stored in the memory 306.

The I/O interface 304 may include a variety of software and hardware interfaces, for example, a web interface, a graphical user interface, and the like. The I/O interface 304 may allow the client machine 104 to interact with the server 102. Further, the I/O interface 304 may enable the client machine 104 to communicate with other computing devices, such as web servers and external data servers (not shown). The I/O interface 304 can facilitate multiple communications within a wide variety of networks and protocol types, including wired networks, for example, LAN, cable, etc., and wireless networks, such as WLAN, cellular, or satellite. The I/O interface 304 may include one or more ports for connecting a number of devices to one another or to another server.

The memory 306 may include any computer-readable medium or computer program product known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory 306 may include modules 308 and data 310.

The modules 308 include routines, programs, objects, components, data structures, etc., which perform particular tasks or implement particular abstract data types. In one implementation, the modules 308 may include a client machine transmission module 312, a client machine receiving module 314, a comparator module 316, an authentication module 318, and other modules 320. The other modules 320 may include programs or coded instructions that supplement applications and functions of the client machine 102. The modules 308 described herein may be implemented as software modules that may be executed in the cloud-based computing environment of the client machine 102.

The data 310, amongst other things, serves as a repository for storing data processed, received, and generated by one or more of the modules 308. The data 310 may also include a client password database 322 and other data 324. The other data 324 may include data generated as a result of the execution of one or more modules in the other modules 320.

As there are various challenges observed in the existing art, the challenges necessitate the need to build the server 102 and the client machine 104 for authenticating the user by validating the password, at a client machine 104, transmitted by the server 102 to the client machine 104. In order to authenticate the user, at first, a user may use the client machine 104 to access the server 102 via the I/O interface 204. The user may register them using the I/O interface[s] 204, 304 to use the server 102. In one aspect, the user may access the I/O interface[s] 204, 304 of the server 102. The server 102 may employ the server receiving module 212 and the server transmission module 214. The client machine 104, on the other hand, may employ the client machine transmission module 312, the client machine receiving module 314, the comparator module 316, and the authentication module 318. The detail functioning of the modules is described below with the help of figures.

It may be noted that the user is authenticated in two steps comprises a pre-authentication step and a post authentication step. In the pre-authentication step, the user is prompted to transmit, via the client machine 104, a User Identification (ID) to the server 102. To do so, the client machine transmission module 312 transmits a User Identification (ID) to the server 102. In one aspect, the client machine transmission module 312 transmits the User Id upon receiving the user ID from the user through one or more input means. Upon transmission, the server receiving module 212 receives the User ID from the client machine 104. Post receipt of the User ID, the server transmission module 214 identifies the password, pertaining to the User ID, from a server password database 218. In one embodiment, the server password database 218 stores a plurality of passwords and metadata associated to each password. In one embodiment, the server password database 218 may be stored on a removable storage (such as a flash disk, or USB drive) or installed on a hard disk drive of the server 102. The data stored on the removable storage (or any other storage device including an hard disk driver, a flash drive, or any other removable disk storage) is protected by encrypting the data using at least one data encryption technique.

In one example, the data stored in the server password database 218 is illustrated in FIG. 4. More specifically, as shown in the FIG. 4, the server password database 218 comprises a plurality of data fields comprises Month, Day, Time Window, Position, Length, Algorithm, and Password. It may be noted that values pertaining to each data filed are unique for each User ID. Based on the above, the server transmission module 214 identifies the password based on User ID received and metadata associated to the User ID may include, but not limited to, Month on which the User ID is received, Day on which the User ID is received, Time at which the User ID is received, Client Location, and Client IP address.

In order to elucidate the aforementioned functionality, consider an example where a user 'Smith' provides his User ID to the server on 'Monday' of 'February' at '10:05 AM'. Then, as per the server password database 218, the server transmission module 214 identifies the password as 'B2574_BHX181K7E5', where '_' can be any character obtained by using a Random Character Generator (RCG) algorithm. After identifying the password, the server transmission module 214 alters the password, to be transmitted, based on the metadata by using a Random Character Generator (RCG) algorithm. In the above example, the length of the password is variable and the maximum length is '20', the server transmission module 214 alters the password from 'B2574_BHX181K7E5' to 'A15742BJX101K7F559JU' with randomly selected characters in a variable number of places, filling it up to the maximum allowed length. Thus, in this manner, the server transmission module 214 transmits the password pertaining to the User ID to the client machine 104.

Once transmitted, the client machine receiving module 214 receives the password from the server 102. Upon receipt of the password, the comparator module 316 compares the password with a complementary password stored in a client password database 322. It may be noted that the client password database 322 and the server password database 218 are having an identical schema and storing identical value in each cell. Similar to the server password database 218, the client password database 322 may also be stored on a removable storage (such as a flash disk, or USB drive) or installed on a hard disk drive of the client machine 104. The data stored on the removable storage (or any other storage device including an hard disk driver, a flash drive, or any other removable disk storage) is protected by encrypting the data using at least one data encryption technique.

In one embodiment, the comparator module 316 also identifies the complementary password, from the client password database 323, pertaining to the User ID upon analyzing the metadata associated to the password i.e. Month on which the User ID was transmitted, Day on which the User ID was transmitted, and Time at which the User ID was transmitted. It may be noted that the complementary password and the password stored in the server password database 218 are same. Once determined, the comparator module 316 compares the password with the complementary password stored in the client password database 322.

Extending the same example as aforementioned, the comparator module 316 prepares a below comparison chart upon comparing the password, altered by the server 102, with the complementary password stored in the client password database 322.

TABLE 1

| A | 1 | 5 | 7 | 4 | 2 | B | J | X | 1 | 0 | 1 | K | 7 | F | 5 | 5 | 9 | J | U |
|---|---|---|---|---|---|---|---|---|---|---|---|---|---|---|---|---|---|---|---|
| B | 2 | 5 | 7 | 4 | — | B | H | X | 1 | 8 | 1 | K | 7 | E | 5 | | | | |

From the above table 1 (comparison chart), the comparator module 316 determines that the change in the password transmitted by the server 102 and the complimentary password present in the client password database 322.

Post determination of the change in the password and the complimentary password, the authentication module 318 prepares a response to the comparison. In one aspect, the response may be prepared based on determination of an algorithm of a plurality of algorithms stored in the client password database 322. It may be noted that each algorithm indicates a unique set of rules that needs to be applied on the comparison. It may further be noted that the client password database 322 and the server password database 218 store a list of algorithms, as shown in FIG. 5. It may be noted that these algorithms and their respective order may be customizable as per need and requirements of an application. In one embodiment, the authentication module 318 determines the algorithm, to be implemented on the comparison, based on analysis performed by the comparator module 316.

In the above, example, since the User ID is transmitted on 'Monday' of 'February' at '10:05 AM', the authentication module 318 determines the algorithm '2' to be implemented on the comparison. As per algorithm '2' of the list of algorithms, the response to be prepared should 'IDENTIFY POSITIONS OF WRONG PASSWORD CHARACTER AND PROVIDE SUM OF THE POSITON OF THE WRONG CHARACTERS'. Based on the algorithm, the comparator module 316 performs character by character comparison between the password with the complementary password and determines the positons of the wrong characters in Row $3^{rd}$ of table 2 mentioned below.

TABLE 2

| A | 1 | 5 | 7 | 4 | 2 | B | J | X | 1 | 0 | 1 | K | 7 | F | 5 | 5 | 9 | J | U |
|---|---|---|---|---|---|---|---|---|---|---|---|---|---|---|---|---|---|---|---|
| B | 2 | 5 | 7 | 4 | — | B | H | X | 1 | 8 | 1 | K | 7 | E | 5 | | | | |
| 1 | 2 | | | | | | 8 | | | 11 | | | | 15 | | | | | |

In one embodiment, the algorithm to be used on the comparison is determined by the authentication module 318 based on value of the algorithm present in the password table (as shown in FIG. 4), fixed based on the Day (i.e. Monday), Month (i.e. February) and Time (i.e. 10:05 AM). In another embodiment, the algorithm to be used may be selected (among the defined ones) by the server 102, using a Random Character Generator (RCG) algorithm. The algorithm which is determined by the RCG is then placed in a certain position inside the password text string sent by the server 102. In one aspect, the algorithm to be used is placed based on a positional value present in the password table. The positional value placed is fixed on the Day, the Month and Time in the aforementioned example. It is then retrieved by the client machine 104 for its further processing.

In a further embodiment a mix of the two methods may be used to determine the algorithm. According to the FIG. 4 i.e. password table specific value in the algorithm and the positional values (one or both values are set). In case, where both the values are explicitly specified (i.e. Algorithm=2 and Position value=6), the algorithm in the password table to be used is '2', and the positional value is '6'.

The authentication module 318 then performs additions of the wrong identified positions and determines the response as '37'. In one embodiment, instead of performing the computation in accordance with the algorithm, the response may comprise a number or a hex representation or pre-agreed letters or words corresponding to numbers, etc.

The authentication module 318 then transmits the response to the server 102 in order to authenticate the user of the client machine 104. Upon transmission, the server receiving module 212 receives the response prepared by the client machine 104. Upon receipt of the response, the server transmission module 214 transmits an acknowledgment to the client machine. The acknowledgment may be transmitted by verifying the response upon referring to the server password database 218. After verification, the authentication module 318 obtains the acknowledgment from the server 102. In one aspect, the acknowledgment indicates that the user is authenticated.

Thus, in this manner, the pre-authentication step is performed and accordingly proceed with the next step of post authentication. In the post authentication step, the server 102 may prompt the user to provide real user credentials. It may be noted that if the user is not authenticated in the pre-authentication, the server 102 does not prompt the user to provide the real user credentials.

On the other hand, if the user is authenticated in the pre-authentication step, the server 102 further prompts the user to transmit the real user credentials to the server 102 through the client machine 104. In one aspect, the real user credentials may be transmitted when the server verifies the response transmitted by the client machine. Subsequently the server 102 verifies the real user credentials upon referring to server password database 218 thereby authenticating the user operating the client machine 104.

It may be noted that any further change might be applied to the aforementioned functionality of the server 102 and the client machine 102. For example, if the user is not authenticated in the pre-authentication step, then a maximum retry logic may be applied which may limit the user to access the resources, if he/she fails to pass the pre-authentication step. Similarly, if the user is not authenticated in the pre-authentication step, one or more actions that needs to be performed may be defined instead of refusing the connection between the server 102 and the client machine 104. It may further be noted that the proposed invention for facilitating the authentication of the user may also be extended to any authentication system requesting a User ID and a password, need not specifically in the client-server architecture. In other words, the proposed invention may also be implemented in a peer to peer network such as block chain.

Figure 6:
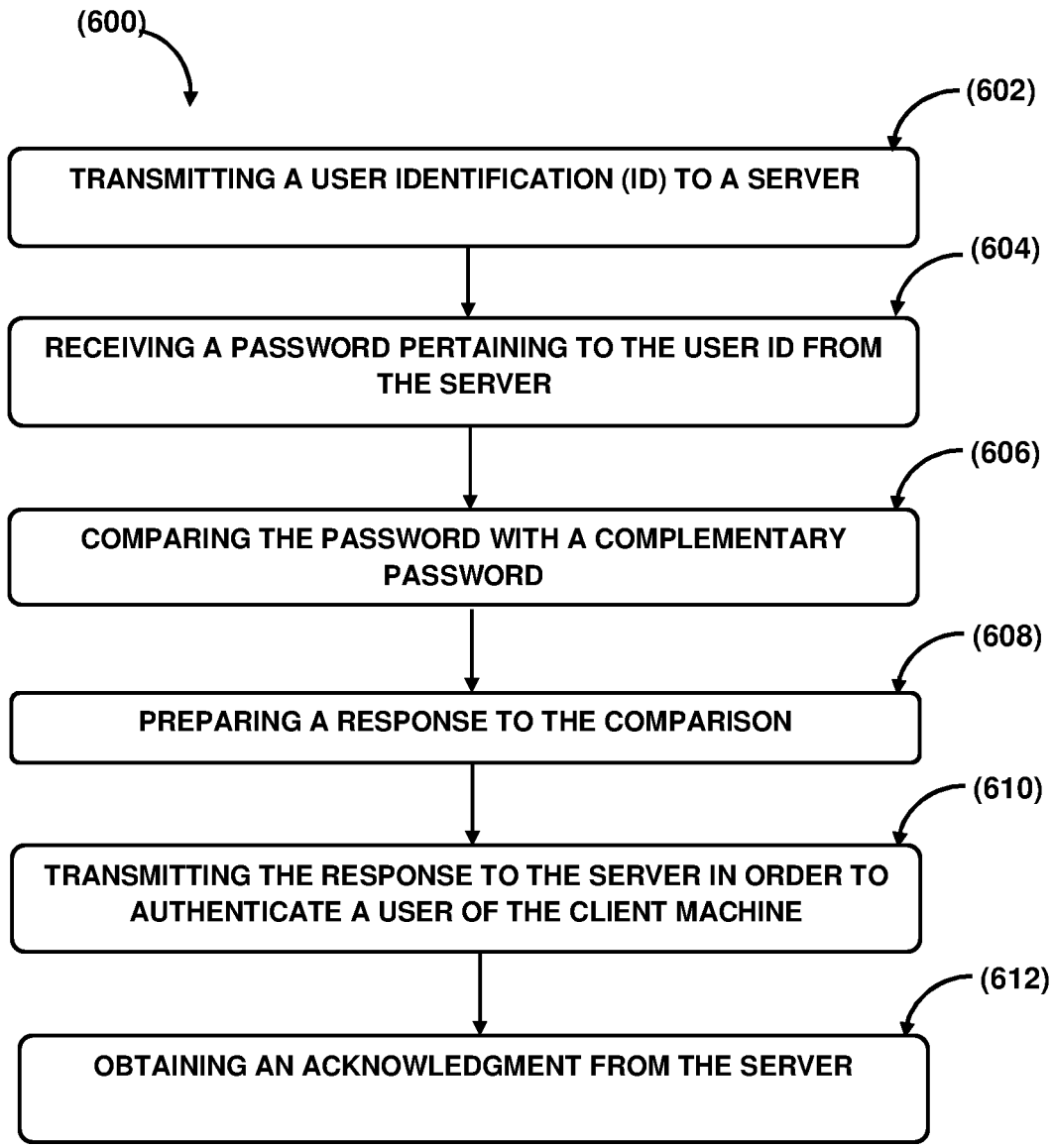
FIG. 6 illustrates a method authenticating a user by validating a password transmitted by a server to the client machine, in accordance with an embodiment of the present subject matter.

Referring now to FIG. 6, a method 600 for authenticating a user characterized by validating a password, at a client machine, transmitted by a server to the client machine is shown, in accordance with an embodiment of the present subject matter. The method 600 may be described in the general context of computer executable instructions. Generally, computer executable instructions can include routines, programs, objects, components, data structures, procedures, modules, functions, etc., that perform particular functions or implement particular abstract data types. The method 600 may also be practiced in a distributed computing environment where functions are performed by remote processing devices that are linked through a communications network. In a distributed computing environment, computer executable instructions may be located in both local and remote computer storage media, including memory storage devices.

The order in which the method 600 is described is not intended to be construed as a limitation, and any number of the described method blocks can be combined in any order to implement the method 600 or alternate methods. Additionally, individual blocks may be deleted from the method 600 without departing from the spirit and scope of the subject matter described herein. Furthermore, the method can be implemented in any suitable hardware, software, firmware, or combination thereof. However, for ease of explanation, in the embodiments described below, the method 600 may be considered to be implemented as described in the client machine 104.

At block 602, a User Identification (ID) may be transmitted by a client machine 104 to a server 102. In one implementation, the User ID may be transmitted by the client machine transmission module 312.

At block 604, a password pertaining to the User ID may be received from the server 102. In one aspect, the password may be received by identifying the password, pertaining to the User ID, from a server password database 218 storing a plurality of passwords and metadata associated to each password and altering the password, to be transmitted, based on the metadata. In one implementation, the password may be received by the client machine receiving module 314.

At block 606, the password may be compared with a complementary password stored in a client password database presents on a client machine. In one aspect, the client password database 322 and the server password database 218 are having an identical schema and storing identical value in each cell. The password may be compared with the complementary password based on the metadata. In one implementation, the password may be compared with the complementary password by the comparator module 316.

At block 608, a response to the comparison may be prepared based on determination of an algorithm of a plurality of algorithms stored in the client password database 322. In one aspect, each algorithm indicates a unique set of rules that needs to be applied on the comparison. In one implementation, the response to the comparison may be prepared by the authentication module 318.

At block 610, the response may be transmitted to the server in order to authenticate the user of the client machine 104, In one implementation, the response may be transmitted by the authentication module 318.

At block 612, an acknowledgment may be obtained from the server 102. In one aspect, the acknowledgment may be obtained when the server verifies the response upon referring to the server password database. It may be understood that the acknowledgment indicates that the user is authenticated. In one implementation, the acknowledgement may be obtained by the authentication module 318.

Figure 7:
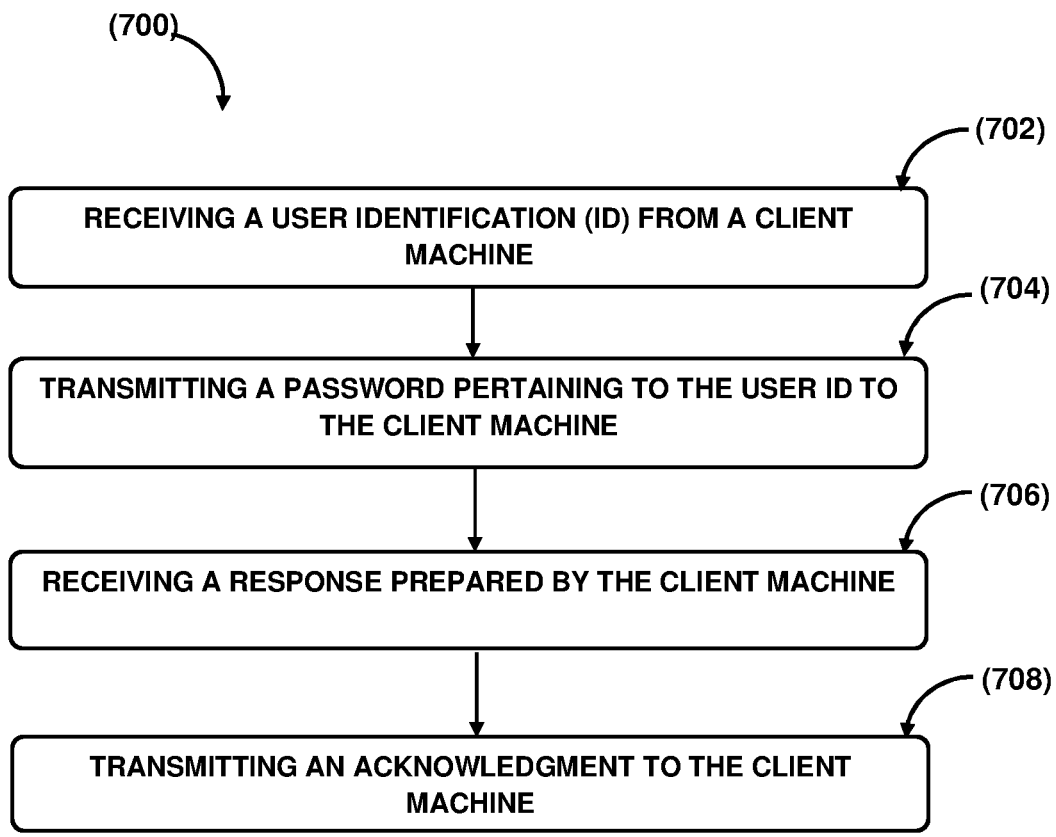
FIG. 7 illustrates a method for authenticating a user by transmitting a password to the client machine, in accordance with an embodiment of the present subject matter.

Referring now to FIG. 7, a method 700 for facilitating authentication of a user characterized by transmitting a password to the client machine is shown, in accordance with an embodiment of the present subject matter. The method 700 may be described in the general context of computer executable instructions. Generally, computer executable instructions can include routines, programs, objects, components, data structures, procedures, modules, functions, etc., that perform particular functions or implement particular abstract data types. The method 700 may also be practiced in a distributed computing environment where functions are performed by remote processing devices that are linked through a communications network. In a distributed computing environment, computer executable instructions may be located in both local and remote computer storage media, including memory storage devices.

The order in which the method 700 is described is not intended to be construed as a limitation, and any number of the described method blocks can be combined in any order to implement the method 700 or alternate methods. Additionally, individual blocks may be deleted from the method 700 without departing from the spirit and scope of the subject matter described herein. Furthermore, the method can be implemented in any suitable hardware, software, firmware, or combination thereof. However, for ease of explanation, in the embodiments described below, the method 700 may be considered to be implemented as described in the server 102.

At block 702, a User Identification (ID) may be received from a client machine 104. In one implementation, the User ID may be received by the server receiving module 212.

At block 704, a password pertaining to the User ID may be transmitted to the client machine. In one aspect, the password may be transmitted by identifying the password, pertaining to the User ID, from a server password database 218 storing a plurality of passwords and metadata associated to each password and altering the password, to be transmitted, based on the metadata by using a Random Character Generator (RCG) algorithm. In one implementation, the password pertaining to the User ID may be transmitted by the server transmission module 214.

At block 706, a response prepared by the client machine may be received in order to authenticate a user of the client machine. In one aspect, the response may be prepared by comparing the password with a complementary password stored in a client password database presents 322 and preparing the response to the comparison based on determination of an algorithm of a plurality of algorithms stored in the client password database 322. It may be noted that the client password database 322 and the server password database 218 are having an identical schema and storing identical value in each cell. The password is compared with the complementary password based on the metadata. In one implementation, the response may be received by the server receiving module 212.

At block 708, an acknowledgment may be transmitted to the client machine 104. In one aspect, the acknowledgment may be transmitted by verifying the response upon referring to the server password database. The acknowledgment indicates that the user is authenticated. In one implementation, the acknowledgment may be transmitted by the server transmission module 214.

Exemplary embodiments discussed above may provide certain advantages. Though not required to practice aspects of the disclosure, these advantages may include those provided by the following features.

Some embodiments enable a system and a method to restrict the intruders intended to access the user credentials floated on the network even if the pre-authentication traffic is intercepted and decrypted.

Some embodiments enable a system and a method to perform the pre-authentication step before being allowing the user to access the resources over the server. As a result of which, if the pre-authentication fails, the real user credentials will never be requested by the server. Moreover, the user might have a limited number of pre-authentication filed attempts, after which a further action may be taken (i.e. temporary revoking pre-authentication access attempts), which provides an additional layer of security.

Some embodiments enable a system and a method to notify an administrator to change the real password when a hacker attempts to have an un-authorized access to the resources by using the user credentials.

Some embodiments enable a system and a method to facilitate an additional layer of authentication method used to log-in and access a server application.

Although implementations for methods and systems for facilitating authentication of a user have been described in language specific to structural features and/or methods, it is to be understood that the appended claims are not necessarily limited to the specific features or methods described. Rather, the specific features and methods are disclosed as examples of implementations for facilitating authentication of the user.

The invention claimed is:

1. A method for authenticating a user characterized by validating a password, at a client machine, transmitted by a server to the client machine, the method comprising:
   transmitting, by a processor of a client machine, a User Identification (ID) to a server;
   receiving, by the processor, a password pertaining to the User ID from the server, wherein the server transmits the password to the client machine by,
       identifying the password, pertaining to the User ID, from a server password database storing a plurality of passwords and metadata associated to each password, and
       altering the password, to be transmitted, based on the metadata;
   comparing, by the processor, the password with a complementary password stored in a client password database presents on a client machine, wherein the client password database and the server password database are having an identical schema and storing identical value in each cell, and wherein the password is compared with the complementary password based on the metadata;
   preparing, by the processor, a response to the comparison based on determination of an algorithm of a plurality of algorithms stored in the client password database, wherein each algorithm indicates a unique set of rules that needs to be applied on the comparison;
   transmitting, by the processor, the response to the server in order to authenticate a user of the client machine; and
   obtaining, by the processor, an acknowledgment from the server, wherein the acknowledgment is obtained when the server verifies the response upon referring to the server password database, and wherein the acknowledgment indicates that the user is authenticated.

2. The method as claimed in claim 1, wherein the metadata comprises Day, Time Window, Position, Length, and Algorithm.

3. The method as claimed in claim 1, wherein the comparison includes character by character comparison between the password with the complementary password.

4. The method as claimed in claim 1, wherein the comparing further comprises:
   analyzing, by the processor, the metadata associated to the password received from the server, wherein the analysis includes determination of Day of transmission of the User ID to the server and Time of transmission of the User ID to the server, and
   determining, by the processor, an algorithm, of the plurality of algorithms, to be implemented on the password, wherein the algorithm is determined based on the analysis.

5. The method as claimed in claim 1, wherein the authenticating further comprises
   prompting, by the processor, the user to transmit a real password to the server through the client machine, wherein the real password is transmitted when the server verifies the response transmitted by the client machine, and
   verifying, by the processor, the real password upon referring to server password database thereby authenticating the user operating the client machine.

6. A client machine for facilitating authentication of a user characterized by validating a password, at the client machine, transmitted by a server, the client machine comprising:
   a processor; and
   a memory coupled to the processor, wherein the processor is capable of executing a plurality of modules stored in the memory, and wherein the plurality of modules comprising:
   a client machine transmission module for transmitting a User Identification (ID) to a server;

a client machine receiving module for receiving a password pertaining to the User ID from the server, wherein the server transmits the password to the client machine by,
  identifying the password, pertaining to the User ID, from a server password database storing a plurality of passwords and metadata associated to each password, and
  altering the password, to be transmitted, based on the metadata;
a comparator module for comparing the password with a complementary password stored in a client password database presents on a client machine, wherein the client password database and the server password database are having an identical schema and storing identical value in each cell, and wherein the password is compared with the complementary password based on the metadata; and
an authentication module for
  preparing a response to the comparison based on determination of an algorithm of a plurality of algorithms stored in the client password database, wherein each algorithm indicates a unique set of rules that needs to be applied on the comparison, transmitting the response to the server in order to authenticate a user of the client machine; and
  obtaining an acknowledgment from the server, wherein the acknowledgment is obtained when the server verifies the response upon referring to the server password database, and wherein the acknowledgment indicates that the user is authenticated.

7. The system as claimed in claim 6, wherein the comparator module is further configured to:
  analyze the metadata associated to the password received from the server, wherein the analysis includes determination of Day of transmission of the User ID to the server and Time of transmission of the User ID to the server, and
  determining an algorithm, of the plurality of algorithms, to be implemented on the password, wherein the algorithm is determined based on the analysis.

8. The system as claimed in claim 6, wherein the authenticating module is further configured to
  prompt the user to transmit a real password to the server through the client machine, wherein the real password is transmitted when the server verifies the response transmitted by the client machine, and
  verify the real password upon referring to server password database thereby authenticating the user operating the client machine.

9. A method for authenticating a user characterized by transmitting a password to the client machine, the method comprising:
  receiving, by a processor of a server, a User Identification (ID) from a client machine;
  transmitting, by the processor, a password pertaining to the User ID to the client machine, wherein the password is transmitted by,
    identifying the password, pertaining to the User ID, from a server password database storing a plurality of passwords and metadata associated to each password, wherein the server password database is present on the server, and
    altering the password, to be transmitted, based on the metadata by using a Random Character Generator (RCG) algorithm;
  receiving, by the processor, a response prepared by the client machine in order to authenticate a user of the client machine, wherein the response is prepared by,
    comparing the password with a complementary password stored in a client password database presents on a client machine, wherein the client password database and the server password database are having an identical schema and storing identical value in each cell, and wherein the password is compared with the complementary password based on the metadata, and
    preparing a response to the comparison based on determination of an algorithm of a plurality of algorithms stored in the client password database, wherein each algorithm indicates a unique set of rules that needs to be applied on the comparison; and
  transmitting, by the processor, an acknowledgment to the client machine, wherein the acknowledgment is transmitted by verifying the response upon referring to the server password database, and wherein the acknowledgment indicates that the user is authenticated.

10. A server for facilitating authentication of a user characterized by transmitting a password to the client machine, the server comprising:
  a processor; and
  a memory coupled to the processor, wherein the processor is capable of executing a plurality of modules stored in the memory, and wherein the plurality of modules comprising:
    a server receiving module for receiving a User Identification (ID) from a client machine;
    a server transmission module for transmitting a password pertaining to the User ID to the client machine, wherein the password is transmitted by,
      identifying the password, pertaining to the User ID, from a server password database storing a plurality of passwords and metadata associated to each password, wherein the server password database is present on the server, and
      altering the password, to be transmitted, based on the metadata by using a Random Character Generator (RCG) algorithm;
    the server receiving module for receiving a response prepared by the client machine in order to authenticate a user of the client machine, wherein the response is prepared by,
      comparing the password with a complementary password stored in a client password database presents on a client machine, wherein the client password database and the server password database are having an identical schema and storing identical value in each cell, and wherein the password is compared with the complementary password based on the metadata, and
      preparing a response to the comparison based on determination of an algorithm of a plurality of algorithms stored in the client password database, wherein each algorithm indicates a unique set of rules that needs to be applied on the comparison; and
    the server transmission module for transmitting an acknowledgment to the client machine, wherein the acknowledgment is transmitted by verifying the response upon referring to the server password database, and wherein the acknowledgment indicates that the user is authenticated.

\* \* \* \* \*